US012351892B2

(12) United States Patent
Weinmann et al.

(10) Patent No.: US 12,351,892 B2
(45) Date of Patent: Jul. 8, 2025

(54) SPHERICAL POWDER FOR MAKING 3D OBJECTS

(71) Applicant: TANIOBIS GMBH, Goslar (DE)

(72) Inventors: Markus Weinmann, Braunschweig (DE); Holger Brumm, Goslar (DE); Christoph Schnitter, Holle (DE)

(73) Assignee: TANIOBIS GMBH, Goslar (DE)

( * ) Notice: Subject to any disclaimer, the term of this patent is extended or adjusted under 35 U.S.C. 154(b) by 464 days.

(21) Appl. No.: 17/775,888

(22) PCT Filed: Nov. 13, 2020

(86) PCT No.: PCT/EP2020/082099
§ 371 (c)(1),
(2) Date: May 11, 2022

(87) PCT Pub. No.: WO2021/094560
PCT Pub. Date: May 20, 2021

(65) Prior Publication Data
US 2022/0395900 A1     Dec. 15, 2022

(30) Foreign Application Priority Data
Nov. 15, 2019    (DE) .................... 10 2019 217 654.2

(51) Int. Cl.
*C22C 1/04*        (2023.01)
*B22F 1/00*        (2022.01)
(Continued)

(52) U.S. Cl.
CPC ................ *C22C 1/045* (2013.01); *B22F 1/00* (2013.01); *B22F 1/052* (2022.01); *B22F 1/065* (2022.01);
(Continued)

(58) Field of Classification Search
CPC ......... C22C 1/045; C22C 1/0458; B22F 1/00; B22F 1/052; B22F 1/065; B22F 9/082;
(Continued)

(56) References Cited

U.S. PATENT DOCUMENTS

2012/0236997 A1   9/2012   Xu et al.
2018/0161882 A1   6/2018   Stawovy et al.
(Continued)

FOREIGN PATENT DOCUMENTS

CN        105296802 A     2/2016
CN        106435270 A     2/2017
(Continued)

OTHER PUBLICATIONS

Hong-Jian et al.; "Derivation and application of concentration formula of alloy genes of DO3-type in BCC alloy systems"; 2018; Journal of Central South University; vol. 25, pp. 1573-1581 (Year: 2018).*

(Continued)

*Primary Examiner* — Adil A. Siddiqui
(74) *Attorney, Agent, or Firm* — Norman B. Thot (57) ABSTRACT

A spherical powder for manufacturing a three-dimensional component. The spherical powder is an alloy powder which has at least two refractory metals. The alloy powder has a homogeneous microstructure and at least two crystalline phases.

18 Claims, 8 Drawing Sheets

(51) Int. Cl.
  *B22F 1/052* (2022.01)
  *B22F 1/065* (2022.01)
  *B22F 3/22* (2006.01)
  *B22F 9/08* (2006.01)
  *B22F 10/25* (2021.01)
  *B22F 10/28* (2021.01)
  *B22F 10/34* (2021.01)
  *B33Y 10/00* (2015.01)
  *B33Y 70/00* (2020.01)

(52) U.S. Cl.
  CPC .............. *B22F 9/082* (2013.01); *B22F 10/25* (2021.01); *B22F 10/28* (2021.01); *B22F 10/34* (2021.01); *B33Y 70/00* (2014.12); *B22F 3/225* (2013.01); *B22F 2009/0848* (2013.01); *B22F 2301/205* (2013.01); *B22F 2304/10* (2013.01); *B33Y 10/00* (2014.12)

(58) Field of Classification Search
  CPC .......... B22F 10/25; B22F 10/28; B22F 10/34; B22F 3/225; B22F 2009/0848; B22F 2301/205; B22F 2304/10; B22F 2998/10; B22F 3/04; B22F 9/08; B22F 10/10; B22F 1/12; B22F 3/11; B33Y 70/00; B33Y 10/00; Y02P 10/25
  See application file for complete search history.

(56) References Cited

U.S. PATENT DOCUMENTS

| | | | |
|---|---|---|---|
| 2018/0162013 A1 | 6/2018 | Fulop et al. | |
| 2018/0258512 A1 | 9/2018 | Sing et al. | |
| 2018/0298469 A1 | 10/2018 | Yang et al. | |
| 2019/0084048 A1* | 3/2019 | Ivanov | B22F 1/065 |
| 2022/0023941 A1 | 1/2022 | Weinmann et al. | |

FOREIGN PATENT DOCUMENTS

| | | |
|---|---|---|
| CN | 107598151 A | 1/2018 |
| CN | 108296490 A | 7/2018 |
| CN | 109434121 A | 3/2019 |
| CN | 106735280 B | 5/2019 |
| CN | 109834260 A | 6/2019 |
| CN | 110049836 A | 7/2019 |
| CN | 110312582 A | 10/2019 |
| EP | 1 144 147 B2 | 2/2012 |
| RU | 2 469 817 C1 | 12/2012 |
| RU | 2 680 322 C1 | 2/2019 |
| TW | 201827617 A | 8/2018 |
| WO | 2011/070475 A1 | 6/2011 |
| WO | WO 2017/048199 A1 | 3/2017 |
| WO | WO 2019/197376 A1 | 10/2019 |

OTHER PUBLICATIONS

ASTM B213—11: "Standard Test Methods for Flow Rate of Metal Powders Using the Hall Flowmeter Funnel", pp. 1-4 (2011).
ASTM B 527—06: "Standard Test Method for Determination of Tap Density of Metallic Powders and Compounds", pp. 1-3 (2006).
ASTM B 822—97: "Standard Test Method for Particle Size Distribution of Metal Powders and Related Compounds by Light Scattering", pp. 1-3 (1997).

* cited by examiner

SPHERICAL POWDER FOR MAKING 3D OBJECTS

CROSS REFERENCE TO PRIOR APPLICATIONS

This application is a U.S. National Phase application under 35 U.S.C. § 371 of International Application No. PCT/EP2020/082099 filed on Nov. 13, 2020 and which claims benefit to German Patent Application No. 10 2019 217 654.2, filed on Nov. 15, 2019. The International Application was published in German on May 20, 2021 as WO 2021/094560 A1 under PCT Article 21(2).

FIELD

The present invention relates to spherical alloy powders composed of at least two refractory metals, where the alloy powder has a homogeneous microstructure and at least two different crystalline phases, and also to a process for producing such powders. The present invention further relates to the use of such powders in the manufacture of three-dimensional components and a component produced from such a powder.

BACKGROUND

Various methods are available for producing metallic components having a complex geometry. Such components can firstly be produced by means of additive manufacturing, also known as 3D printing. The term "additive manufacturing" encompasses all manufacturing processes in which three-dimensional articles are produced by applying material in each case layerwise under computer control and joining the layers to one another, generally by means of physical and chemical curing or melting processes. Additive manufacturing processes are in particular characterized by their high precision and dimensional accuracy and make it possible to produce models and patterns quickly and inexpensively. A further possible way of producing metallic components is metal powder injection molding (MIM—metal injection molding) which has its origin in injection molding technology for plastics. In MIM, a fine metal powder is mixed with an organic binder and introduced by means of an injection molding machine into a mold. The binder is subsequently removed and the component is sintered. The mechanical advantages of sintered components can thereby be combined with the large shaping variety of injection molding. As a further advantage, the process offers the opportunity of producing components having a demanding geometry in one piece, which can only be made in a plurality of parts via conventional processes.

Customary materials for use in additive manufacturing processes and injection molding processes are polymers, synthetic resins, ceramics, and metals. While there is now a large selection of polymer materials which are routinely used in these processes, there continues to be a need for suitable powders in the field of metals. These in particular need to have good flowability and high sintering activity in order to be processable so as to provide stable and resistant objects.

WO 2011/070475 describes a process for producing an alloy comprising at least two high-melting metals, in which process the two high-melting metals are melted and mixed in a melting crucible by use of an electron beam and the molten material is solidified, with the molten metals being quenched at a cooling rate in the range from 200 $Ks^{-1}$ to 2000 $Ks^{-1}$ to effect solidification. It is recommended that the two metals be provided in the form of a powder and be mixed with one another before melting in order to achieve complete dissolution of the two metals in one another. It is here particularly important that the two metals form a solid solution in any composition and that the occurrence of a second phase be prevented. The process described has the disadvantage, however, that a large amount of impurities is introduced into the powder by use of the melting crucible and the high temperatures required.

US 2019/084048 describes a process for producing atomized, spherical β-Ti/Ta alloy powders for additive manufacturing, comprising the following steps: a) mixing of elemental Ti and Ta powders to form a Ti—Ta powder composition; b) hot isostatic pressing of the powder composition to form a Ti—/Ta electrode, and c) treatment of the Ti/Ta electrode by means of EIGA to give an atomized, spherical Ti/Ta alloy powder. The process described has the disadvantage, however, that the resulting powders have an inhomogeneous microstructure which can be undesirable for some applications.

CN 108296490 describes a production process for a spherical tungsten-tantalum alloy powder in which an irregularly shaped tungsten-tantalum mixed powder, which has been produced using a high-energy ball milling process, is used as the raw material. The raw powder used is shaped by means of plasma spheroidization to provide the desired alloy powder. The milling process used is known to have the disadvantage of undesirable introduction of abraded material from the milling balls.

The processes described in the prior art for producing alloy powders have the disadvantage that large proportions of foreign particles are sometimes introduced into the powders in the production process and that the powders have a dendritic element distribution which can in turn have an adverse effect on the quality of the components which are produced from these powders since the components must be sintered for a relatively long time and generally also at a relatively high temperature in order to obtain the desired mechanical strength.

SUMMARY

An aspect of the present invention is to overcome the disadvantages of the prior art and to provide a powder which makes it possible to manufacture pore-free and mechanically stable components, in particular components having a complex geometry, which are suitable for high-temperature applications.

In an embodiment, the present invention provides a spherical powder for manufacturing a three-dimensional component. The spherical powder is an alloy powder comprising at least two refractory metals. The alloy powder has a homogeneous microstructure and at least two crystalline phases.

BRIEF DESCRIPTION OF THE DRAWINGS

The present invention is described in greater detail below on the basis of embodiments and of the drawings in which.

DETAILED DESCRIPTION

The present invention firstly provides a spherical powder for manufacturing three-dimensional components, wherein the powder is an alloy powder which is composed of at least two refractory metals and which has a homogeneous microstructure and at least two different crystalline phases.

The powder of the invention is characterized by a good flowability and high sintering activity, which makes possible the production of pore-free and mechanically stable components via additive manufacturing and/or injection molding.

For the purposes of the present invention, the expression "alloy powder" is intended to be synonymous with the powder of the present invention, unless the contrary is indicated.

Refractory metals are, for the purposes of the present invention, the high-melting base metals of the third, fourth, fifth and sixth transition groups of the Periodic Table of the Elements. These metals are characterized not only by their high melting point, but by the fact that they have a passivating layer at room temperature.

For the purposes of the present invention, the term "alloy powder" refers to a powder in which the refractory metals are present in the form of an alloy and form a microscopically homogeneous powder. Theses powders are in contrast to mixed powders in which the constituents are present individually in the form of a mixture and an inhomogeneous element distribution is macroscopically present.

A "homogeneous microstructure" is, for the purposes of the present invention, a homogeneous element distribution, i.e., a uniform distribution and space filling of the alloy components in the individual powder particles without macroscopic fluctuations from place to place.

For the purposes of the present application, the term "particle size" refers to the longest linear dimension of a powder particle from one end to the opposite end of the particle.

"Agglomerates" are, for the purposes of the present invention, conglutinated accumulations of previously loose powder particles. The previously loose particles which are, for example, formed into agglomerates by sintering are described as "primary particles".

The use of additive manufacturing methods and MIM extends to virtually all branches of industry. The properties of the components produced can here be influenced by the powders used; not only the mechanical properties of the components, but also further properties such as optical and electronic properties, can be adapted.

In an embodiment of the powder of the present invention, the refractory metals can, for example, be metals selected from the group consisting of tantalum, niobium, vanadium, yttrium, titanium, zirconium, hafnium, tungsten and molybdenum. The at least two refractory metals can, for example, be tantalum and tungsten. In an embodiment, the alloy powder of the invention can, for example, be free of Ti. The proportion of titanium in the alloy powder of the present invention can in this case, for example, be less than 1.5% by weight, for example, less than 1.0% by weight, for example, less than 0.5% by weight and especially, for example, less than 0.1% by weight, in each case based on the total weight of the alloy powder.

The powder of the present invention is in particular characterized in that the alloy powder has at least two different crystal phases. It has been found to be particularly advantageous for one of these crystal phases to be a metastable crystal phase. A metastable crystal phase in this context is a phase which is thermodynamically unstable at room temperature. The crystal phases occurring in the alloy powder of the present invention can, for example, be determined by means of X-ray diffraction analyses (XRD) and can be distinguished with the aid of their reflections in the X-ray diffraction pattern. The distribution of the different crystal phases in the powder can vary. In an embodiment of the present invention, one crystal phase can, for example, make up a larger proportion than the other crystal phases. This phase having the largest proportion is referred to as "main crystal phase", while phases having a smaller proportion are referred to as "secondary crystal phases" or "secondary phases". The powder of the present invention can, for example, comprise a main crystal phase and at least one secondary crystal phase. It has surprisingly been found that the ratio of the phases has an influence on the mechanical properties of a future component, with the ratio of the phases being able to be determined by their reflection intensities in the X-ray diffraction pattern, there reported as impulses per angle [° 2Theta]. In an embodiment, the ratio of the reflection having the greatest intensity of the at least one secondary phase (I(P2)100) and the reflection having the greatest intensity in the main crystal phase (I(P1)100), expressed as I(P2)100/I(P1)100, can, for example, be less than 0.75, for example, from 0.05 to 0.55, for example, from 0.07 to 0.4, in each case determined by means of X-ray diffraction.

A further aspect which distinguishes the powder of the present invention is its homogeneous microstructure. Alloy powders, in particular refractory metals, generally have the disadvantage that the various alloy constituents are, as a result of the method of production, inhomogeneously distributed in the individual powder particles since the residence time of the particles is generally too short to achieve sufficient mixing and diffusion of the individual constituents. This inhomogeneous distribution in particular results in disadvantages in respect of the mechanical properties of the components made from these powders, which can be compensated for in the production process only by use of a significantly higher energy input, for example, in the SLM process, by a significantly higher laser power or lower scanning speed of the laser. It has surprisingly been found in the context of the present invention, however, that the powders themselves intrinsically have a homogeneous distribution of the alloy constituents. In an embodiment of the powder of the present invention, the alloy elements, expressed in percent by weight, within a particle can, for example, vary by less than 8%, for example, by from 0.005 to 6%, for example, from 0.05 to 3%, determined by means of EDX (energy dispersive X-ray spectroscopy), in at least 95%, for example, in at least 97%, for example, in at least 99%, of all powder particles.

Figure 11:
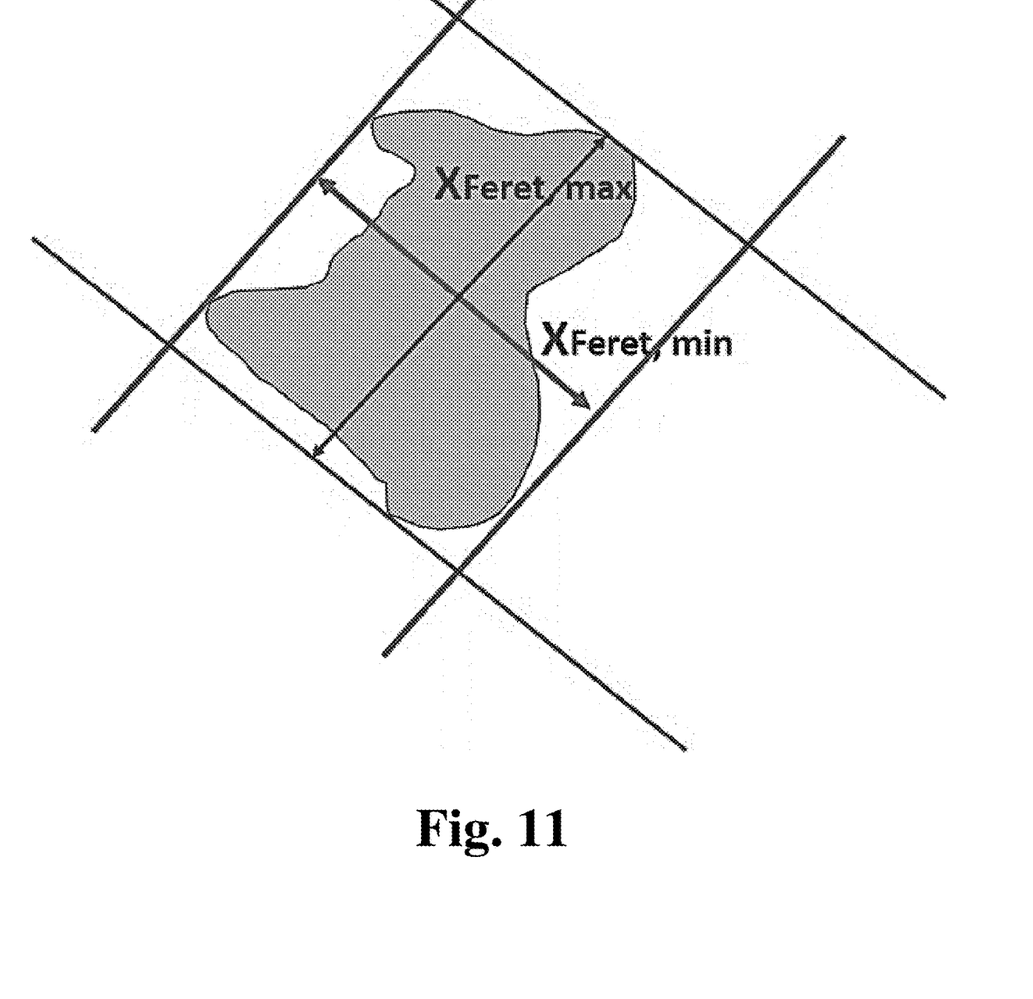
FIG. 11 shows how the Feret diameter of a particle can, for example, be determined by means of image analysis methods from scanning electron micrographs (SEM).

The powder of the present invention is in particular characterized by its sphericity, which makes it particularly suitable for use in additive manufacturing processes and injection molding processes. In an embodiment, the powder particles can, for example, have an average aspect ratio $\Psi_A$ of from 0.7 to 1, for example, from 0.8 to 1, for example, from 0.9 to 1, and in particular from 0.95 to 1, where $\Psi_A$ is defined as the ratio of the minimum Feret diameter to the maximum Feret diameter, expressed as $\Psi_A = x_{Feret\ min}/x_{Feret\ max}$. The Feret diameter is the distance between two tangents of a particle at any angle. The maximum Feret diameter $x_{Feret\ max90}$ can be determined by firstly determining the maximum Feret diameter and then determining the Feret diameter which is offset by an angle of 90° from this maximum Feret diameter. This applies analogously to the determination of the minimum Feret diameter. The Feret diameter of a particle can, for example, be determined by means of image analysis methods from scanning electron micrographs (SEM) (cf. also FIG. 11).

Apart from the sphericity, the flowability of a powder is a further criterion which in particular determines its suitability for use in additive manufacturing processes. The powder of the present invention is characterized by a flowability which is matched to requirements in these manufacturing processes. In an embodiment of the powder of the present invention, the powder can, for example, have a flowability of less than 25 s/50 g, for example, less than 20 s/50 g, and in particular less than 15 s/50 g, in each case determined in accordance with ASTM B213.

The powder of the present invention also displays a high tap density, which is a further criterion which should be taken into account in selecting a powder for use in such manufacturing processes. In an embodiment, the powder of the present invention can, for example, have a tapped density of from 40 to 80% of its theoretical density, for example, from 60 to 80% of its theoretical density, in each case determined in accordance with ASTM B527.

It is known that the mechanical properties and the porosity of components which are produced by means of such manufacturing processes can be controlled, inter alia, via the particle size of the powders used, with the particle sizes being selected as a function of the respective manufacturing process and a narrow particle size distribution having been found to be particularly advantageous. In an embodiment of the present invention, the powder of the present invention can, for example, have a particle size distribution having a D10 of greater than 2 μm, for example, greater than 5 μm, and a D90 of less than 80 μm, for example, less than 70 μm, with a D50 of from 20 to 50 μm, for example, from 25 to 50 μm, in each case determined in accordance with ASTM B822. This particle size distribution has been found to be particularly advantageous for selective laser melting (SLM) processes.

In an embodiment, the D10 of the particle size distribution of the powder of the present invention can, for example, be more than 20 μm, for example, more than 50 μm, and the D90 is less than 150 μm, for example, less than 120 μm, with a D50 of from 40 to 90 μm, for example, from 60 to 85 μm, in each case determined in accordance with ASTM B822. A particle size distribution as indicated has been found to be particularly advantageous particularly in the field of electron beam melting processes (EBM).

In an embodiment, the powder of the present invention can, for example, have a particle size distribution having a D10 of more than 50 μm, for example, more than 80 μm, and a D90 of less than 240 μm, for example, less than 210 μm, with a D50 of from 60 to 150 μm, for example, from 100 to 150 μm, in each case determined in accordance with ASTM B822. Powders having such a particle size distribution have been found to be particularly advantageous in the use of laser cladding processes (CL).

In an embodiment, the powder of the present invention can, for example, have a particle size distribution having a D10 of more than 1 μm, for example, more than 2 μm, and a D90 of less than 45 μm, for example, less than 40 μm, with a D50 of from 6 to 30 μm, for example, from 8 to 20 μm, in each case determined in accordance with ASTM B822. A particle size distribution in the range indicated has been found to be advantageous particularly when such powders are used in injection molding processes, such as metal injection molding (MIM).

For the purposes of the present invention, the D50 is the average particle size at which 50% of the particles are smaller than the values indicated. The D10, D90 and D99 values are defined analogously.

The present invention further provides a process for producing the alloy powder of the present invention. The process of the present invention comprises the following steps:

a) provision of a starting powder mixture comprising at least two refractory metals, where the starting powder mixture has a particle size having a D99 of less than 100 μm and at least one of the refractory metals has a particle size having a D99 of less than 10 μm, in each case determined in accordance with ASTM B822;

b) production of a powder body from the starting powder mixture by means of cold isostatic pressing (CIP);

c) sintering of the pressed body at a temperature which is from 400 to 1150° C. below, for example, from 700 to 1050° C. below the lowest melting point of the components of the starting powder mixture;

d) melting of the sintered body by means of electrode induction melting (EIGA); and e) atomization of the melt with simultaneous cooling to give a spherical alloy powder.

It has surprisingly been found that spherical powders having a narrow particle size distribution and a high sinter activity and which allow the production of pore-free and mechanical stable components by means of additive manufacturing processes or MIM are obtained via the process of the present invention. The powders produced by the process of the present invention are also characterized by a homogeneous distribution of the alloy constituents and the presence of at least two crystal phases.

The pressing (CIP) of the powder can, for example, be carried out at an applied pressing pressure of at least $1.7 \cdot 10^8$ Pa (1700 bar), for example, at least $1.9 \cdot 10^8$ Pa (1900 bar).

In an embodiment, the process of the present invention can, for example, further comprise a classification step, for example, sieving. The desired particle size distribution can thereby be adjusted and set.

In an embodiment, the starting powder mixture can, for example, have a particle size having a D99 of less than 100 μm, for example, less than 80 μm, in each case determined by means of ASTM B822.

In an embodiment, at least one of the refractory metals in the starting powder mixture can, for example, have a particle size having a D99 of less than 10 μm, for example, less than 5 μm, for example, less than 2 μm, in each case determined by means of ASTM B822, with the refractory metal involved here, for example, being the refractory metal having the highest melting point.

It has been advantageous for refractory metals whose primary particles have been sintered together to form porous agglomerates to be used in the starting powder mixture, in particular refractory metals which have a primary particle size of less than 10 μm, for example, less than 3 μm, for example, less than 1 μm, determined by means of image analysis methods from scanning electron micrographs (SEM). In an embodiment, at least one refractory metal of the starting powder mixture can, for example, be present in the form of sintered, porous agglomerates having a particle size having a D99 of less than 100 μm, for example, less than 80 μm, determined in accordance with ASTM B822, and which has a primary particle size of less than 10 μm, for example, less than 3 μm, for example, less than 1 μm, determined by means of scanning electron micrographs.

The sintering in step c) of the process of the present invention is carried out at a temperature which is from 400 to 1150° C. below, for example, from 700 to 1050° C. below, the melting point of the alloy component having the lowest melting point, with the melting points of the alloy constituents being known to the person skilled in the art or being able to be taken from the literature. The duration of the sintering operation can be matched to the required properties of the powder, but can, for example, be from 0.5 to 6 hours, for example, from 1 to 5 hours.

In the context of the present invention, refractory metals having a high melting point can, for example, be used. For this reason, sintering can, for example, be carried out at a temperature of at least 1400° C.

It has been found that for some applications, a high oxygen content in the alloy powder has an adverse effect on the use thereof in particular manufacturing processes. In an embodiment of the process of the present invention, the alloy powder can, for example, be additionally subjected to a deoxidizing step in the presence of a reducing agent, for example, using magnesium or calcium, in particular in the form of a vapor, as the reducing agent. A detailed description of a suitable deoxidizing process may be found by a person skilled in the art in, for example, the patent document EP 1 144 147.

To keep the oxygen content of the powder of the present invention as low as possible even during the production process, it has been found to be advantageous for cooling to take place in a low-oxygen environment. In an embodiment, the cooling during atomization can, for example, be carried out by means of a cooled inert gas.

Targeted setting of the oxygen content is, however, desirable for specific applications. In an embodiment, an oxygen-containing component of the refractory metals, for example, oxides or suboxides thereof, can, for example, therefore be added to the starting powder mixture in order to set a desired oxygen content in the powders of the present invention in a targeted manner.

It has surprising been found that the powders of the present invention can be used not only in additive manufacturing processes but also for producing three-dimensional components by means of metal injection molding (MIM). The present invention therefore further provides for the use of the powder of the present invention or of a powder which has been obtained in accordance with the process of the present invention in additive manufacturing processes and/or metal injection molding processes. The additive manufacturing process can, for example, be a process selected from the group consisting of selective laser melting (SLM), electron beam melting (EBM) and laser cladding (LC).

The present invention further provides a component which has been produced using the alloy powder of the present invention or a powder which has been obtained by means of the process of the present invention. The component can, for example, be a component which is used in high-temperature applications, for example, in connection with engines and high-temperature furnaces. As an alternative, the component can, for example, be a medical implant or instrument.

EXAMPLES

The present invention is illustrated by the following examples which are in no way to be interpreted as restricting the inventive concept.

Powders Ta2.5W (E1) and Ta13W (E2) according to the present invention were produced. In the starting powder mixtures the particle size D99 of the tantalum powders used was 49 μm and that of the tungsten powders was 1.9 μm, in each case measured in accordance with ASTM B822. The powders were shaped by means of cold isostatic pressing (CIP) at a pressing pressure of 2000 bar to give a pressed body which was sintered at 1950° C. for two hours. The sintered body obtained in this way was melted by means of electrode induction melting (EIGA) and the melt was atomized with simultaneous cooling. After classification of the atomized powders by sieving into two fractions (<63 μm, 63-100 μm), the resulting alloy powders <63 μm were deoxidized in the presence of Mg at 1000° C. for two hours. The compositions and properties of the powders obtained are summarized in TABLE 1, with the parameters in each case having been determined in accordance with the standards indicated above.

The oxygen and nitrogen contents of the powders were determined by means of carrier gas hot extraction (Leco TCH600) and the particle sizes were in each case determined by means of laser light scattering (ASTM B822, MasterSizer S, dispersion in water and Daxad® 11.5 min ultrasound treatment). Trace analysis of the metallic impurities was carried out by means of ICP-OES using the following analytical instruments PQ 9000 (Analytik Jena) or Ultima 2 (Horiba). Determination of the crystal phases was carried out by means of X-ray diffraction (XRD) using an instrument from Malvern-PANalytical (X'Pert-MPD with semiconductor detector, X-ray tubes Cu LFF with 40 kV/40 mA, Ni-Filter).

TABLE 1

| | Experiment 1 Ta-2.5W | | | Experiment 2 Ta-13W | | | |
| --- | --- | --- | --- | --- | --- | --- | --- |
| | E1a After EIGA | E1b After classification <63 μm | E1c After classification <63 μm and after deox 1000° C./2 h/Mg | E2a After EIGA | E2b After classification <63 μm | E2c After classification <63 μm and after deox 1000° C./2 h/Mg | E2d After classification [63-100 μm] |
| C [ppm] | 15 | 18 | 21 | 15 | 18 | 23 | 22 |
| H [ppm] | <10 | <10 | <10 | <10 | <10 | <10 | <10 |
| N [ppm] | 27 | 15 | 20 | 27 | <10 | 20 | 15 |
| O [ppm] | 757 | 986 | 357 | 1033 | 1236 | 573 | 908 |
| W [%] | 2.5 | 2.5 | 2.5 | 13.2 | 12.9 | 13 | 13.1 |
| F [ppm] | <50 | <50 | <50 | <50 | <50 | <50 | <50 |
| Al [ppm] | <100 | <100 | <100 | <100 | <100 | <100 | <100 |
| Ca [ppm] | <100 | <100 | <100 | <100 | <100 | <100 | <100 |
| Cr [ppm] | <100 | <100 | <100 | <100 | <100 | <100 | <100 |
| Fe [ppm] | <100 | <100 | <100 | <100 | <100 | <100 | <100 |
| Hf [ppm] | <100 | <100 | <100 | <100 | <100 | <100 | <100 |
| K [ppm] | <100 | <100 | <100 | <100 | <100 | <100 | <100 |
| Mg [ppm] | <100 | <100 | <100 | <100 | <100 | <100 | <100 |
| Mn [ppm] | <100 | <100 | <100 | <100 | <100 | <100 | <100 |
| Mo [ppm] | <100 | <100 | <100 | <100 | <100 | <100 | <100 |
| Na [ppm] | <100 | <100 | <100 | <100 | <100 | <100 | <100 |
| Ni [ppm] | <100 | <100 | <100 | <100 | <100 | <100 | <100 |
| Si [ppm] | <100 | <100 | <100 | <100 | <100 | <100 | <100 |
| Ti [ppm] | <100 | <100 | <100 | <100 | <100 | <100 | <100 |
| Zr [ppm] | <100 | <100 | <100 | <100 | <100 | <100 | <100 |
| Nb [ppm] | <100 | <100 | <100 | <100 | <100 | <100 | <100 |
| Tapped density [g/cm$^3$] | 11.1 | 10.6 | 10.5 | 11 | 10.9 | 11.1 | 10.8 |
| Hall Flow [s/50 g] | 10 | 6 | 6 | 8 | 9 | 8 | 6 |
| Particle size | | | | | | | |
| D10 (μm) | 16.5 | 19.4 | 22.1 | 16.2 | 16.7 | 18.2 | 64.1 |
| D50 (μm) | 56.6 | 35.1 | 36.0 | 57.1 | 31.3 | 33.2 | 82.1 |
| D90 (μm) | 371.9 | 60.9 | 62.3 | 349.6 | 55.8 | 59.5 | 98.5 |
| Crystal phases | Cubic/ tetragonal | Cubic/ tetragonal | Cubic/ tetragonal | Cubic/ tetragonal | Cubic/ tetragonal | Cubic/ tetragonal | Cubic/ tetragonal |
| I(P2)100/ I(P1)100 | 0.07 | 0.1 | 0.05 | 0.29 | 0.26 | 0.31 | 0.3 |
| Microstructure determined by EDX | Homogeneous | Homogeneous | Homogeneous | Homogeneous | Homogeneous | Homogeneous | Homogeneous |
| Variation of the alloy elements in % by weight within a powder particle | 3.5 | 3 | 2.9 | 6.0 | 5.8 | 5.3 | 5.1 |
| Powder shape determined by SEM | Spherical | Spherical | Spherical | Spherical | Spherical | Spherical | Spherical |
| Feret diameter, ΨA | 0.9 | 0.95 | 0.93 | 0.89 | 0.96 | 0.94 | 0.95 |

Figure 1:
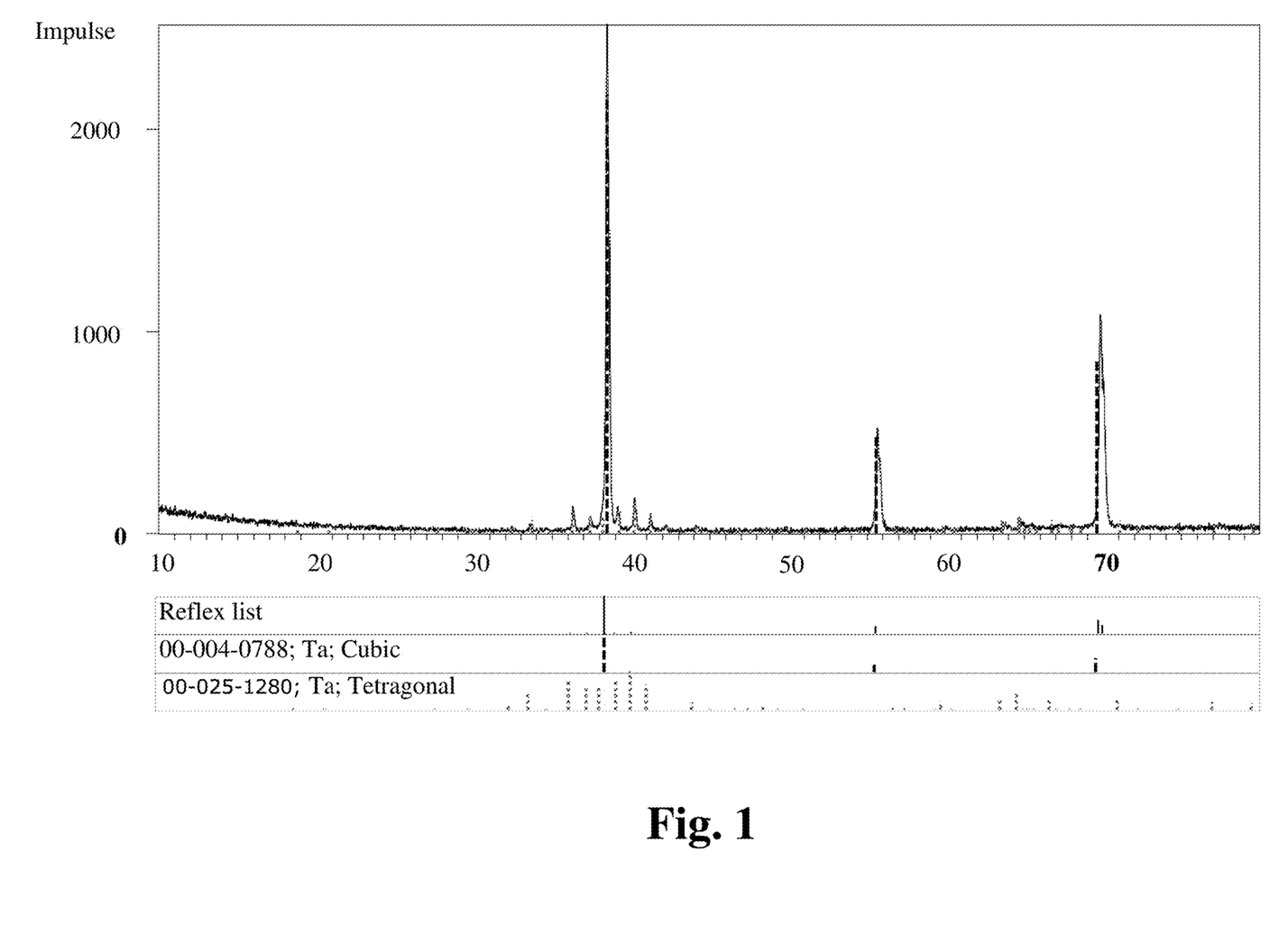
FIG. 1 shows an X-ray diffraction pattern of a powder according to the present invention (Ta2.5W) where two different crystalline phases are identifiable, namely a cubic main crystal phase and a tetragonal secondary crystal phase.
Figure 2:
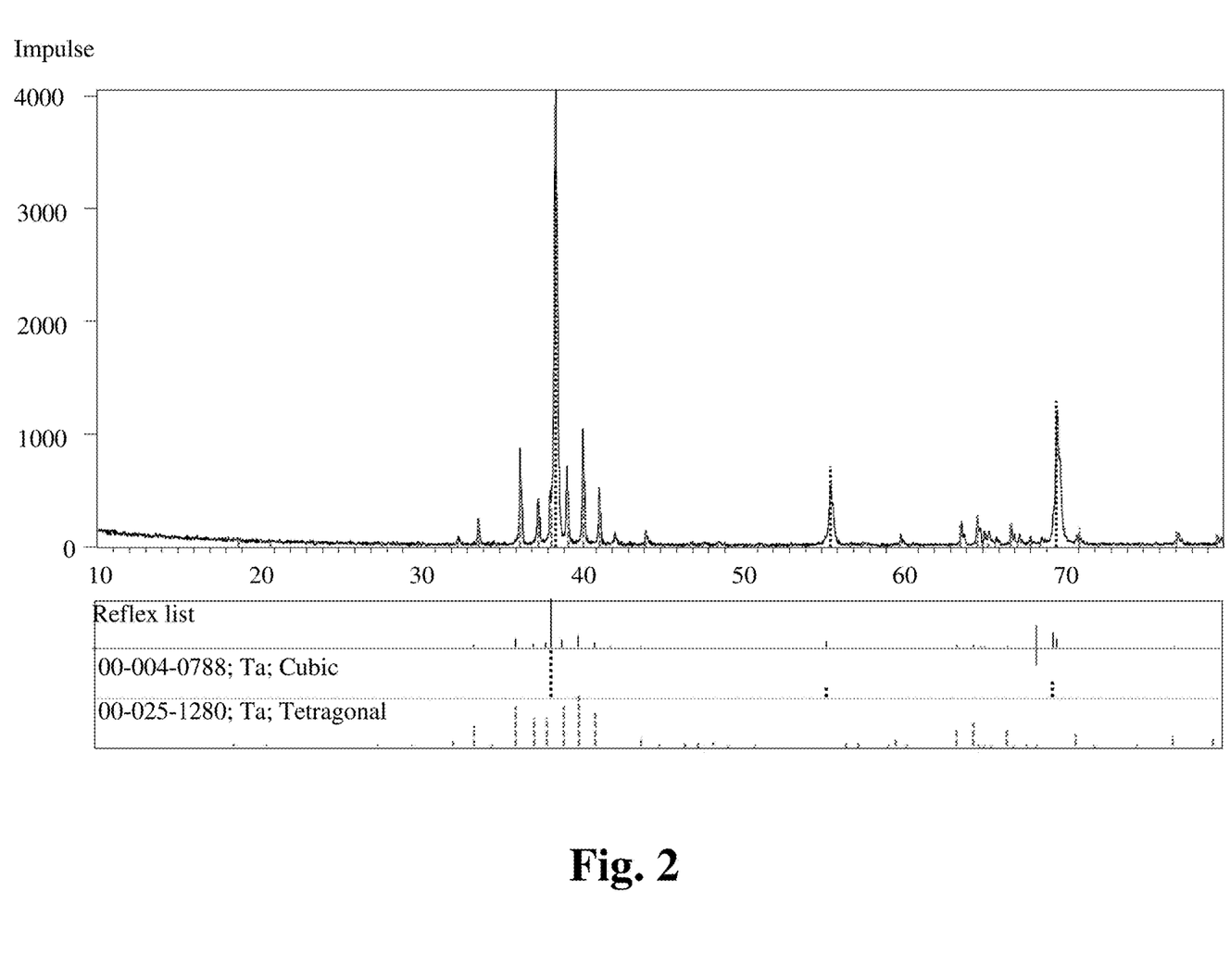
FIG. 2 shows an X-ray diffraction pattern of a powder according to the present invention (Ta13W) where two different crystalline phases are identifiable, namely a cubic main crystal phase and a tetragonal secondary crystal phase.

In the powders according to the present invention, two different crystalline phases could in each case be identified in the X-ray diffraction pattern, namely, a cubic main crystal phase and a tetragonal secondary crystal phase, as can also be seen from FIGS. 1 and 2 which each show patterns for the inventive powders Ta2.5W (FIG. 1) and Ta13W (FIG. 2). The calculated ratios of the reflection intensities for the reflections having the greatest intensities in each case are reported in TABLE 1.

Figure 3:
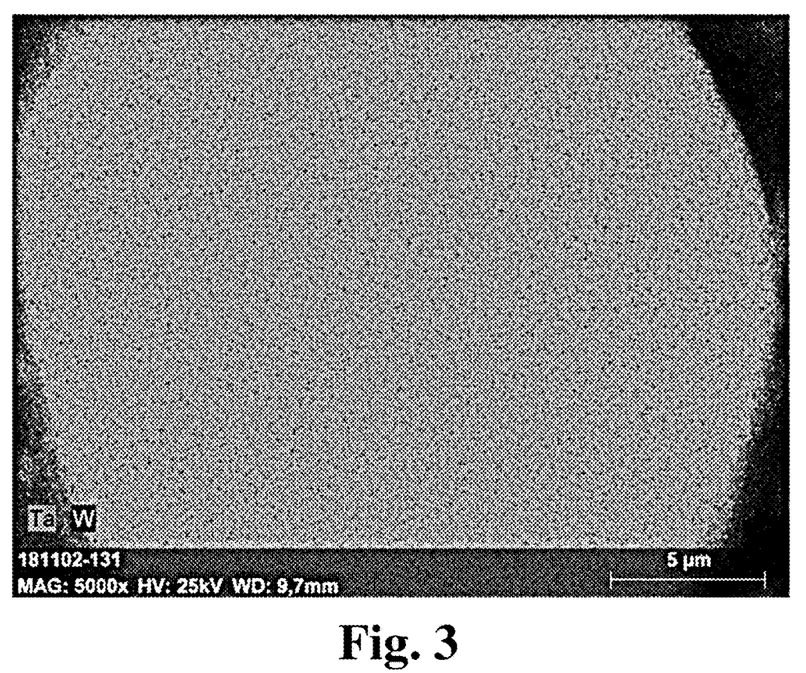
FIG. 3 shows an EDX image of a polished specimen made from the powder Ta13W where no dendritic structures are identifiable and the powder particle is spherical.
Figure 4:
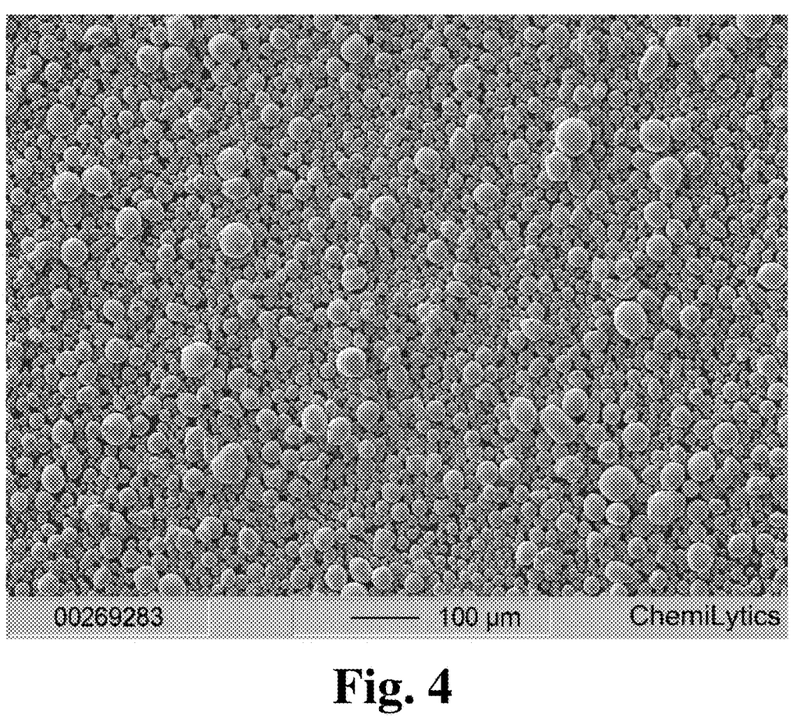
FIG. 4 shows an SEM image in a strewn slide which shows the spherical shape of the powder particles of Ta13W and where no dendritic structures are identifiable.

Further pictures of the powder Ta13W from experiment E2b show that in contrast to conventional powders, no dendritic structures are identifiable and the powder particles are spherical. FIG. 3 here shows an EDX image of a polished specimen made from the powder Ta13W, while FIG. 4 shows the spherical shape of the powder particles of Ta13W with the aid of an SEM image in a strewn slide.

For comparative purposes, a powder Ta2.5W (Comp1) was produced by the conventional process by firstly producing a melt ingot by means of an electron beam. This was embrittled by hydrogenation with hydrogen and milled. The hydrogen was removed in a high vacuum and the material was sieved to a valve of less than 63 μm. The corresponding results are summarized in TABLE 2.

Figure 5:
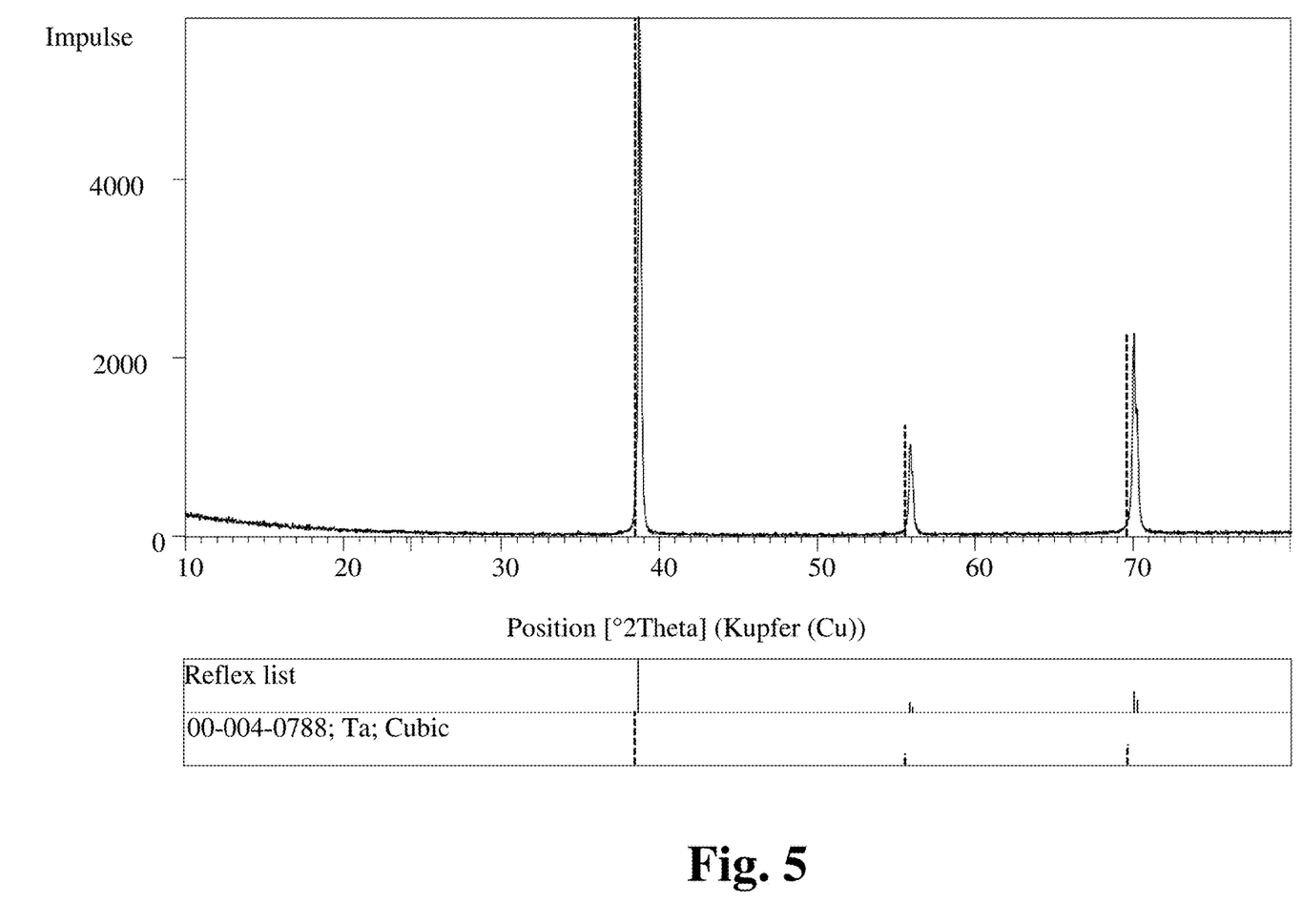
FIG. 5 shows an X-ray diffraction pattern of a powder Ta2.5W (Comp1) which was produced by a conventional process which shows that the powder obtained does not have two different crystal phases.
Figure 6:
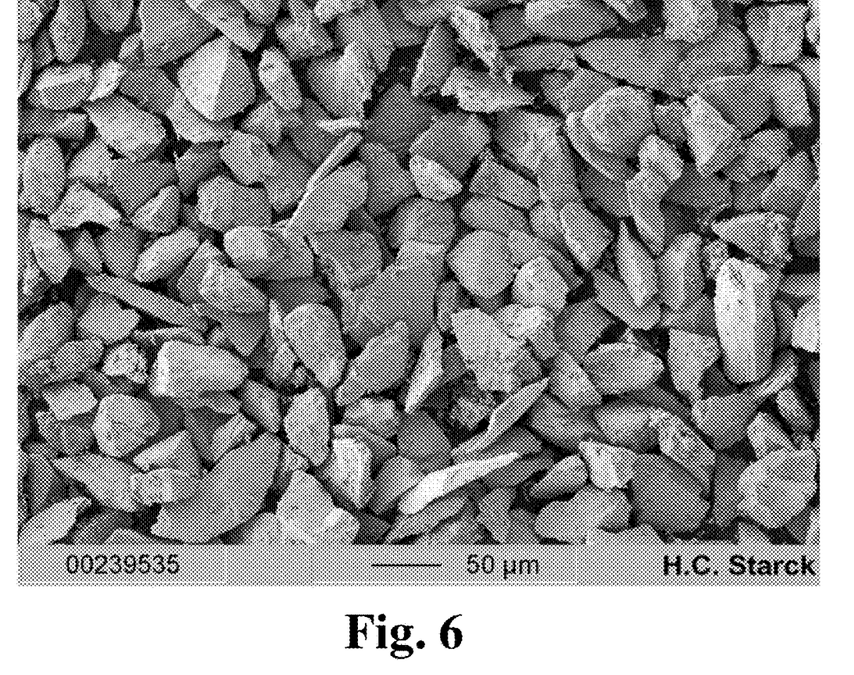
FIG. 6 shows a scanning electron micrograph of the powder Ta2.5W (Comp1) of FIG. 5 which was produced by a conventional process which shows that the powder obtained does not have a spherical morphology.

As X-ray diffraction analyses and scanning electron micrographs show, the powder obtained had neither two different crystal phases nor a spherical morphology (see FIGS. 5 and 6).

TABLE 2

| | Comparison 1 Ta-2.5W | | Comparison 2 -Ta-2.5W | | Comparison 3 Ta-13W | |
|---|---|---|---|---|---|---|
| | Comp 1a Ingot hydrogenation/ dihydrogenation | Comp 1b After classification <63 μm | Comp 2a After EIGA | Comp 2b After classification <63 μm | Comp 3a After EIGA | Comp 3b After classification <63 μm |
| W [%] | 2.8 | 2.8 | 2.9 | 3.0 | 12.5 | 12.8 |
| Crystal phases | Cubic | Cubic | Cubic | Cubic | Cubic | Cubic |
| Microstructure determined by EDX | Dendritic | Dendritic | Dendritic | Dendritic | Dendritic | Dendritic |
| Variation of the alloy elements in % by weight within a powder particle | 7.2 | 8.7 | 10.2 | 9.8 | 14.6 | 15.8 |
| Powder shape determined by SEM | Irregular | Irregular | Spherical | Spherical | Spherical | Spherical |
| Feret diameter, ΨA | 0.15 | 0.22 | 0.88 | 0.9 | 0.91 | 0.92 |
| Hall flow [s/50 g] | Not flowable | Not flowable | 9 | 8 | 8 | 8 |

As a further comparison, a powder Ta2.5W (Comp2) was produced by pressing the corresponding starting powders and sintering at 1200° C. to give a metal body which was subsequently atomized. The particle sizes D99 of the starting metals Ta and W were 150 μm and 125 μm, respectively. The results are likewise summarized in TABLE 2.

A third comparative powder was produced in a manner analogous to Comparison 2, but using 13% by weight of W (Comp3, see TABLE 2).

Figure 7:
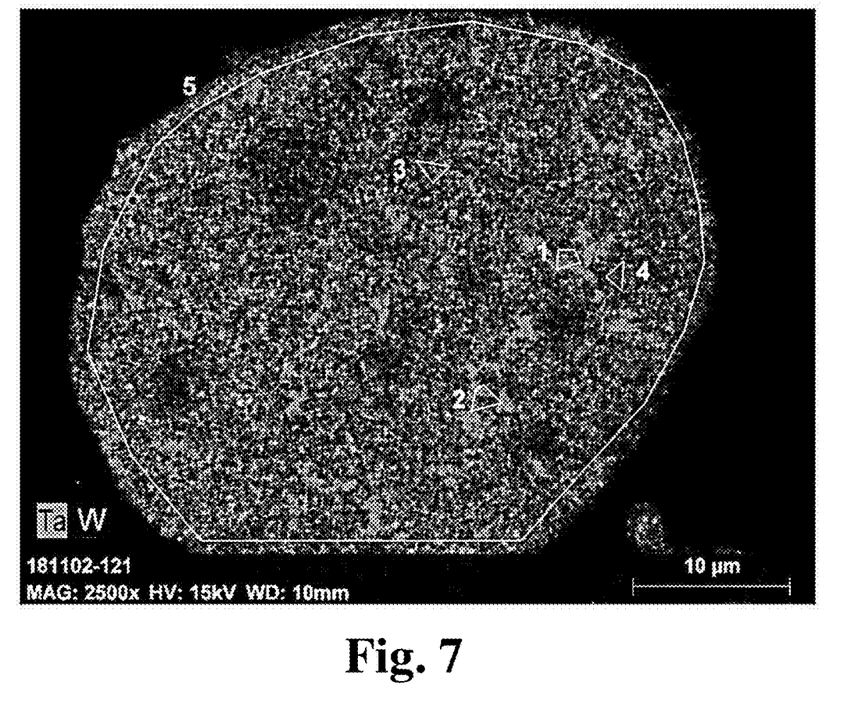
FIG. 7 shows that the powder of Comp3 having a dendritic microstructure.
Figure 8:
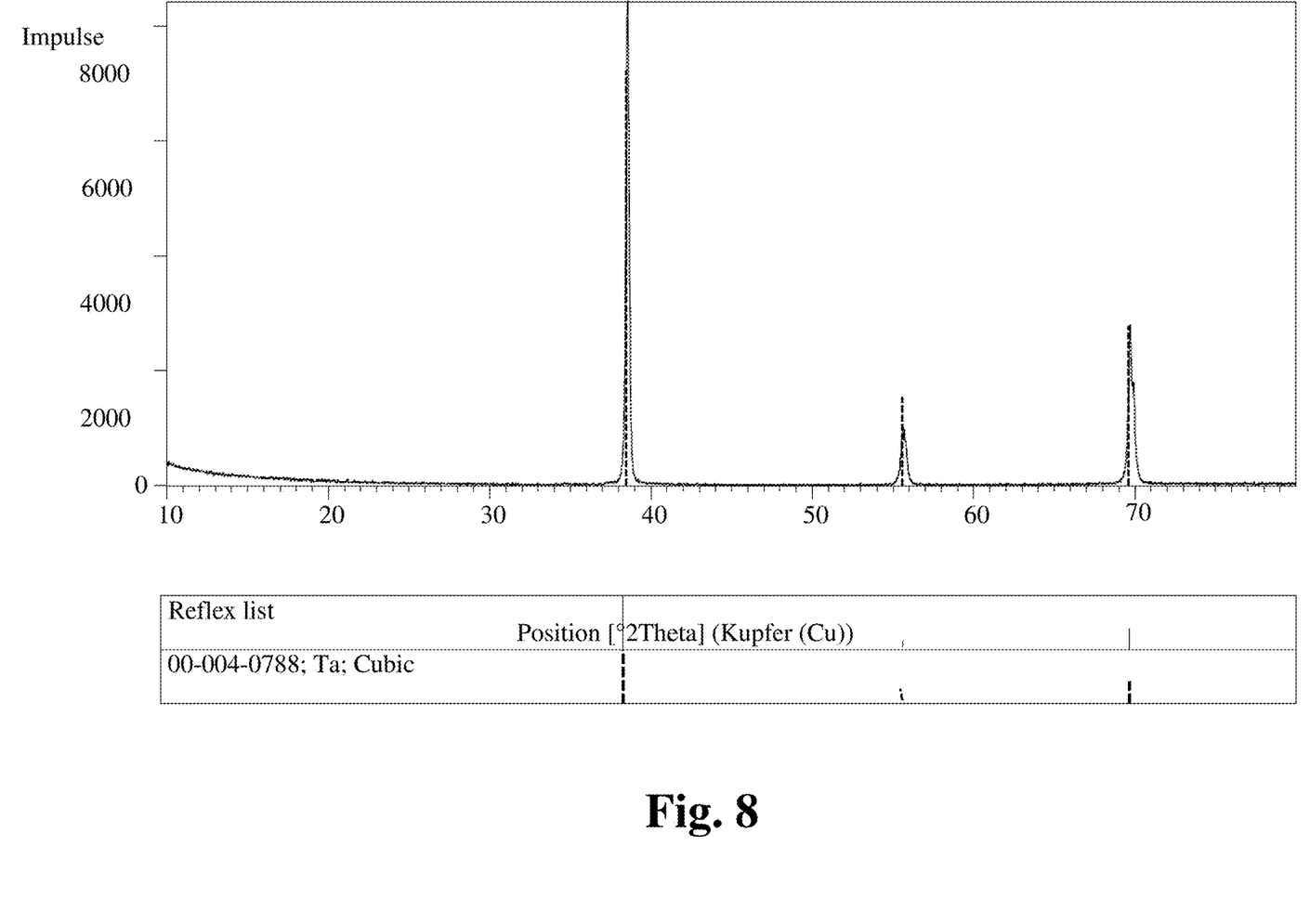
FIG. 8 shows an X-ray diffraction pattern of the powder of Comp3 as shown in FIG. 7 where a second crystal phase is not identifiable.

As FIG. 7 clearly shows, the powder of Comp3 has a dendritic microstructure; the variation in the tantalum and tungsten contents is depicted by means of different shades of grey and was up to 15% by weight in the regions denoted by 1 to 4. A second crystal phase could not be identified (see FIG. 8).

As the comparative experiments show, it was not possible to obtain any powders which had a homogeneous microstructure or elemental distribution and at the same time have two different crystal phases by means of known processes.

The powder of Comparison 3 (Comp3) and also the inventive powder E2b were printed by means of SLM using the printed parameters indicated in Table 3. The intention was here to produce a very dense, cube-shaped component having an edge length of about 2.5 cm and a homogeneous microstructure. The density of the component is reported as ratio of the density actually measured of the component to the theoretical density of the alloy in %. A density of less than 100% indicates the presence of undesirable pores which can lead to an adverse effect on the mechanical properties of the component.

The component produced by means of the powder according to the present invention was able to be obtained with the required density even at a low laser power or volumetric energy density, which leads, inter alia, to increased process reliability, a lower energy consumption and a lower oxygen uptake of the remaining powder. As an alternative, the scanning speed of the laser could be increased, so that a higher throughput was achieved.

TABLE 3

| Experiment on SLM Printing | D1 | D2 | D3 | D4 |
|---|---|---|---|---|
| TaW alloy powder employed from experiment | Comp3b | Comp3b | E2b | E2b |
| Printing parameters for SLM | | | | |
| Scanning speed of laser [mm/s] | 900 | 900 | 900 | 1300 |
| Laser power [W] | 110 | 170 | 110 | 170 |
| Volumetric energy density [J/mm3] | 76 | 118 | 76 | 81 |
| Crystal phases after printing | Cubic | Cubic | Cubic | Cubic |
| Microstructure determined by EDX | Homogeneous | Homogeneous | Homogeneous | Homogeneous |
| Variation of the alloy elements in % by weight within a powder particle | 7.2 | 5.1 | 3.8 | 4 |
| Actual density of printed body relative to the theoretical density of the alloy [%] | 79.5 | 99.2 | 99 | 99.3 |

Figure 9:
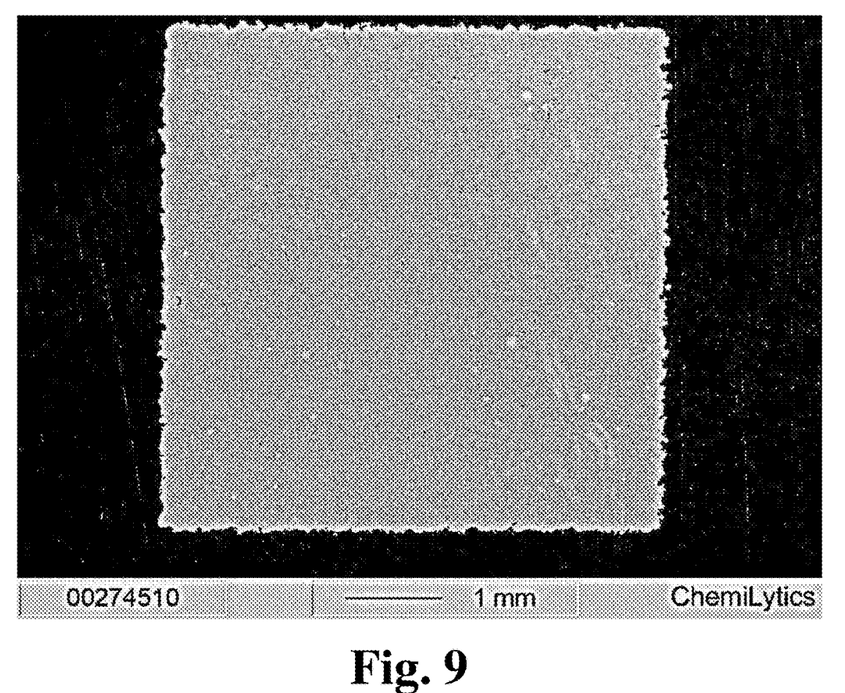
FIG. 9 shows a scanning electron micrograph of a polished specimen of the component (D3) which had been produced using the inventive powder E2b and which had a density of 99% of the theoretical density.

FIG. 9 shows a scanning electron micrograph of a polished specimen of the component (D3) which had been produced using the inventive powder E2b and had a density of 99% of the theoretical density.

Figure 10:
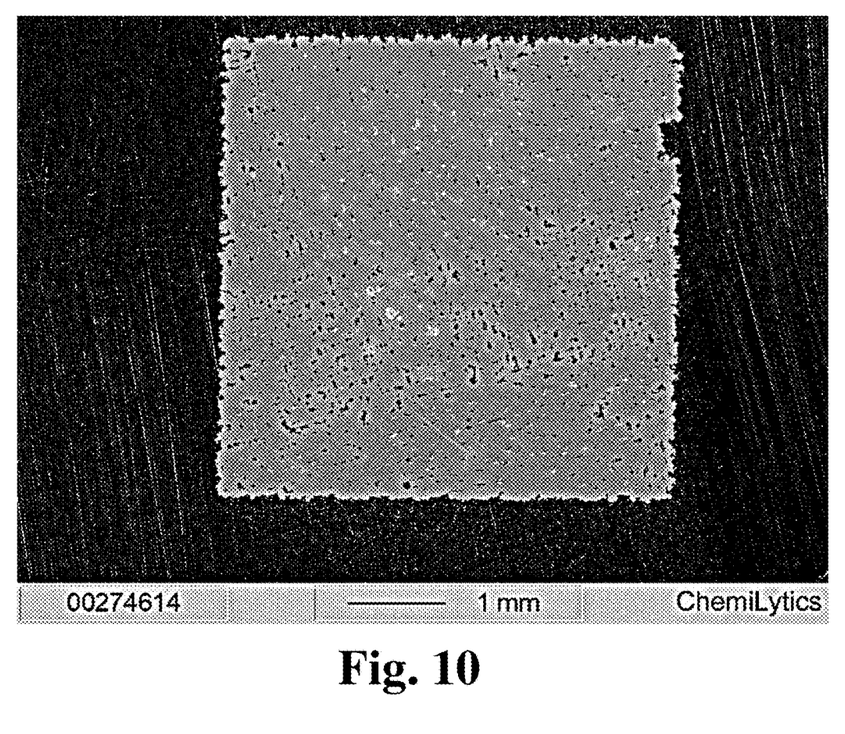
FIG. 10 shows a scanning electron micrograph of a polished specimen of a component D1 which was produced using the comparative powder Comp3b.

FIG. 10 shows a scanning electron micrograph of a polished specimen of a component D1 which had been produced using the comparative powder Comp3b. The low density of the component of less than 80% of the theoretical density can clearly be discerned.

The present invention is not limited to embodiments described herein; reference should be had to the appended claims.

What is claimed is:

1. A spherical powder for manufacturing a three-dimensional component, the spherical powder being an alloy powder comprising at least two refractory metals, wherein,
the alloy powder has a homogeneous microstructure and at least two crystalline phases, and
the spherical powder has a flowability of <25 s/50 g, as determined in accordance with ASTM B213.

2. The spherical powder as recited in claim 1, wherein the at least two refractory metals are tantalum, niobium, vanadium, yttrium, titanium, zirconium, hafnium, tungsten and molybdenum.

3. The spherical powder as recited in claim 1, wherein the alloy powder is essentially free of Ti.

4. The spherical powder as recited in claim 1, wherein a content of Ti in the alloy powder is <1.5 wt.-%.

5. The spherical powder as recited in claim 1, wherein one of the at least two crystalline phases is a metastable crystal phase.

6. The spherical powder as recited in claim 1, wherein,
the spherical powder comprises a main crystal phase and at least one secondary crystal phase, and
an intensity ratio of a reflection from an X-ray diffraction pattern having a greatest intensity of at the least one secondary crystal phase (I(P2)100) and a greatest intensity of the main crystal phase (I(P1)100), expressed as I(P2)100/I(P1)100, is less than 0.75, in each case determined via an X-ray diffraction.

7. The spherical powder as recited in claim 1, wherein the at least two refractory metals of the alloy powder within a particle of the spherical powder varies by <8%, as determined by an EDX (energy dispersive X-ray spectroscopy), in at least 95% of all powder particles of the spherical powder.

8. The spherical powder as recited in claim 1, wherein the spherical powder has a tap density of from 40 to 80% of a theoretical density, as determined in accordance with ASTM B527.

9. A process for producing the spherical powder as recited in claim 1, the method comprising:
providing a starting powder mixture comprising at least two refractory metals, wherein the starting powder mixture has a particle size with a D99 of <100 μm and at least one of the at least two refractory metals has a particle size with a D99 of <10 μm, in each case determined in accordance with ASTM B822;
producing a pressed powder body from the starting powder mixture via a cold isostatic pressing (CIP);
sintering the pressed powder body at a temperature of from 400 to 1150° C. below a lowest melting point of the at least two refractory metals of the starting powder mixture;
melting the pressed powder body via an electrode induction melting so as to obtain a melt; and
atomizing the melt with a simultaneous cooling to provide the spherical powder.

10. The method as recited in claim 9, wherein one of the at least two refractory metals of the starting powder mixture is present in a form of porous agglomerates having a particle size D99 of <100 μm, determined in accordance with ASTM B822.

11. The method as recited in claim 9, wherein the sintering is performed over a time of from 0.5 to 6 hours.

12. The method as recited in claim 9, further comprising: deoxidizing in a presence of a reducing agent.

13. The method as recited in claim 12, wherein the reducing agent is magnesium or calcium in a vapor form.

14. The method as recited in claim 9, wherein the atomizing of the melt with the simultaneous cooling is performed with a cooled inert gas.

15. A method of using the spherical powder as recited in claim 1 in at least one of an additive manufacturing process and a metal powder injection molding process (MIM), the method comprising:
providing the spherical powder as recited in claim 1; and
using the spherical powder in at least one of the additive manufacturing process and the metal powder injection molding process (MIM).

16. The method of using as recited in claim 15, wherein the additive manufacturing process is selected from the group consisting of a selective laser melting (SLM), an electron beam melting (EBM), and a laser cladding (LC).

17. A method of using the spherical powder which is produced via the method as recited in claim 9 in at least one of an additive manufacturing process and a metal powder injection molding process (MIM), the method comprising:
producing the spherical powder via the method as recited in claim 9; and
using the spherical powder in at least one of the additive manufacturing process and the metal powder injection molding process (MIM).

18. The method of using as recited in claim 17, wherein the additive manufacturing process is selected from the group consisting of a selective laser melting (SLM), an electron beam melting (EBM), and a laser cladding (LC).

* * * * *